United States Patent
Deshpande et al.

(10) Patent No.: US 10,558,753 B2
(45) Date of Patent: Feb. 11, 2020

(54) SOFTWARE PROVISIONING USING AN INTERACTIVE CHAT-BASED USER INTERFACE

(71) Applicant: SAP SE, Walldorf (DE)

(72) Inventors: Swapnil Deshpande, South San Francisco, CA (US); Rajiv Sharma, South San Francisco, CA (US); Abhijit Salvi, Cupertino, CA (US)

(73) Assignee: SAP SE, Walldorf (DE)

( * ) Notice: Subject to any disclaimer, the term of this patent is extended or adjusted under 35 U.S.C. 154(b) by 51 days.

(21) Appl. No.: 15/639,897

(22) Filed: Jun. 30, 2017

(65) Prior Publication Data

US 2019/0005022 A1    Jan. 3, 2019

(51) Int. Cl.
| | |
|---|---|
| *G06F 8/60* | (2018.01) |
| *G06F 8/70* | (2018.01) |
| *G06F 17/27* | (2006.01) |
| *G06F 9/54* | (2006.01) |
| *G06F 8/61* | (2018.01) |
| *G06Q 30/00* | (2012.01) |

(52) U.S. Cl.
CPC ............ *G06F 17/2765* (2013.01); *G06F 8/60* (2013.01); *G06F 8/61* (2013.01); *G06F 8/70* (2013.01); *G06F 9/547* (2013.01); *G06F 17/271* (2013.01); *G06F 17/279* (2013.01); *G06Q 30/016* (2013.01)

(58) Field of Classification Search
CPC ..................................... G06F 8/60; G06F 8/70
See application file for complete search history.

(56) References Cited

U.S. PATENT DOCUMENTS

| | | | | |
|---|---|---|---|---|
| 9,846,899 B1* | 12/2017 | Stickle | ............... | G06F 21/10 |
| 2003/0097422 A1* | 5/2003 | Richards | ............... | G06F 8/61 |
| | | | | 709/217 |
| 2003/0195921 A1* | 10/2003 | Becker | ............... | H04L 29/06 |
| | | | | 709/200 |
| 2004/0110494 A1* | 6/2004 | Cohen | ............... | H04M 1/72522 |
| | | | | 455/414.1 |
| 2008/0172300 A1* | 7/2008 | Karki | ............... | G06Q 30/06 |
| | | | | 705/26.8 |
| 2010/0076972 A1* | 3/2010 | Baron | ............... | G06F 17/278 |
| | | | | 707/736 |
| 2013/0086385 A1* | 4/2013 | Poeluev | ............... | G06F 12/1416 |
| | | | | 713/176 |

(Continued)

*Primary Examiner* — Bryan S Blankenagel
(74) *Attorney, Agent, or Firm* — Buckley, Maschoff & Talwalkar LLC (57) ABSTRACT

Systems and methods for performing software provisioning using an interactive chat-based user interface. The method includes receiving a chat input from a user by a chat controller. The method further includes interpreting the user input using natural language processing to determine a requested feature to be provisioned to the user. The method further includes determining, by accessing a provisioning database, an identifier of the requested feature and identifiers of dependent features which are to be provisioned with the requested feature. The method further includes enabling the requested feature and the determined dependent features by accessing the provisioning database based on at least one parameter, the at least one parameter comprising an identifier of the requested feature and the identifiers of the determined dependent features obtained in the determining step.

18 Claims, 5 Drawing Sheets

(56) References Cited

U.S. PATENT DOCUMENTS

| | | | |
|---|---|---|---|
| 2013/0122882 A1* | 5/2013 | Patel | H04L 41/0886 |
| | | | 455/418 |
| 2014/0032350 A1* | 1/2014 | Biswas | G06F 21/125 |
| | | | 705/26.3 |
| 2015/0081361 A1* | 3/2015 | Lee | H04W 4/203 |
| | | | 705/7.13 |
| 2015/0261518 A1* | 9/2015 | Viswanathan | G06F 8/71 |
| | | | 717/168 |
| 2016/0196124 A1* | 7/2016 | Vedula | G06F 8/60 |
| | | | 717/177 |
| 2016/0373458 A1* | 12/2016 | Moreton | H04L 63/102 |
| 2017/0337355 A1* | 11/2017 | Biswas | G06F 21/6209 |
| 2018/0007206 A1* | 1/2018 | Klein | H04M 3/5191 |
| 2018/0218046 A1* | 8/2018 | Woo | G06F 17/30507 |
| 2018/0260541 A1* | 9/2018 | Riscutia | H04L 9/08 |

\* cited by examiner

ChatBot: Hi John! How can I help you today?

- John: I would like to enable ISC for my company

Chatbot: Sure, let me check to see whether Intelligent Service Center (ISC) is already enabled...

Chatbot: I see that ISC is not enabled but I also found this feature requires Generic Objects, Intelligent Services, Business Process Engine, and Attachment manager to be enabled. Would you like me to enable them as well if they're not already enabled?

- John: Yes

Chatbot: Ok. I'm processing your request...

Chatbot: I have successfully enabled ISC for you along with Business Process Engine, which is required for ISC. The other required features were already enabled.

SOFTWARE PROVISIONING USING AN INTERACTIVE CHAT-BASED USER INTERFACE

FIELD OF THE INVENTION

The disclosed embodiments are directed to performing software provisioning using an interactive chat-based user interface.

BACKGROUND

Managing customer-specific features for a complex software system, i.e., "provisioning," can be a very cumbersome process, as it typically requires back and forth communication between a customer and a customer service/project systems (CS/PS) team. In conventional approaches, the customer creates a feature change request to the CS/PS team, the CS/PS team verifies that the customer has purchased the particular feature, and the CS/PS team then processes or rejects the request. These tasks increase the burden on the CS/PS organization and may result in a long turnaround time user's feature addition request.

Typically, the customer is unable to add features through a self-service process due to the complexities of the provisioning system. For example, conventional provisioning tools are not user-friendly and are therefore difficult for customers to use directly. Another difficulty is that feature names may not be consistent. For example, "metadata framework (MDF)" and "Generic Object" are different names referring to the same feature. This may result in inconsistency in enabling the essential components of the feature, which can result in further problems. Also, the features may not appear in a logical order and may not be grouped consistently. This may result in a situation in which the details of a feature are listed in a different section of the configuration. Users who are not familiar with the particular feature may miss such details, which can result in a loss of functionality. Further difficulties may arise because enabling a feature typically requires looking up any dependent features and enabling them as well. For example, if a user wants to enable "Intelligent Service Center" (ISC), then the user must also enable "Generic Objects," "Intelligent Services," "Business Process Engine," and "Attachment Manager." These dependent features may be in scattered locations in the provisioning configuration interface, which can make finding them difficult.

SUMMARY

In one aspect, the disclosed embodiments are a method, and corresponding system, for performing software provisioning using an interactive chat-based user interface. The method includes receiving a chat input from a user, at a server having a processor, memory, and a network interface. The user input is received via the network interface by a chat controller running on the processor of the server. The user input is interpreted using natural language processing to determine a requested feature to be provisioned to the user. The method further includes determining, by accessing a provisioning database an identifier of the requested feature and identifiers of dependent features which are to be provisioned with the requested feature. The method further includes enabling the requested feature and the determined dependent features by accessing the provisioning database based on at least one parameter, the at least one parameter including an identifier of the requested feature and the identifiers of the determined dependent features obtained in the determining step.

The disclosed embodiments may include one or more of the following features.

The determining step may include calling a feature dependency API to determine the identifiers of the dependent features and provisioning indicators indicating whether the requested feature and the determined dependent features are enabled for the user. The enabling step may include calling the feature dependency API, which changes a setting of at least one provisioning indicator, in the provisioning database, corresponding to the requested feature and the determined dependent features.

A natural language response may be sent to the user via the network using the chat controller, the response identifying the requested feature and the determined dependent features and requesting confirmation from the user to perform the provisioning. A natural language response may be sent to the user via the network using the chat controller, the response identifying the requested feature and the determined dependent features which have been enabled.

The provisioning database may include provisioning indicators, each of the provisioning indicators relating to a corresponding user and a corresponding feature. Each of the indicators may have a first setting indicating that the corresponding feature is enabled for the corresponding user and a second setting indicating that the corresponding feature is not enabled for the corresponding user.

The determining of the identifier of the requested feature may include accessing the provisioning database to retrieve the identifier of the requested feature based on a name of the requested feature obtained from the user input. The method may further include retrieving aliases of the name of the requested feature. The method may further include sending a natural language response to the user via the network using the chat controller, the response requesting confirmation or clarification of a name of the requested feature.

DETAILED DESCRIPTION

Figure 1:
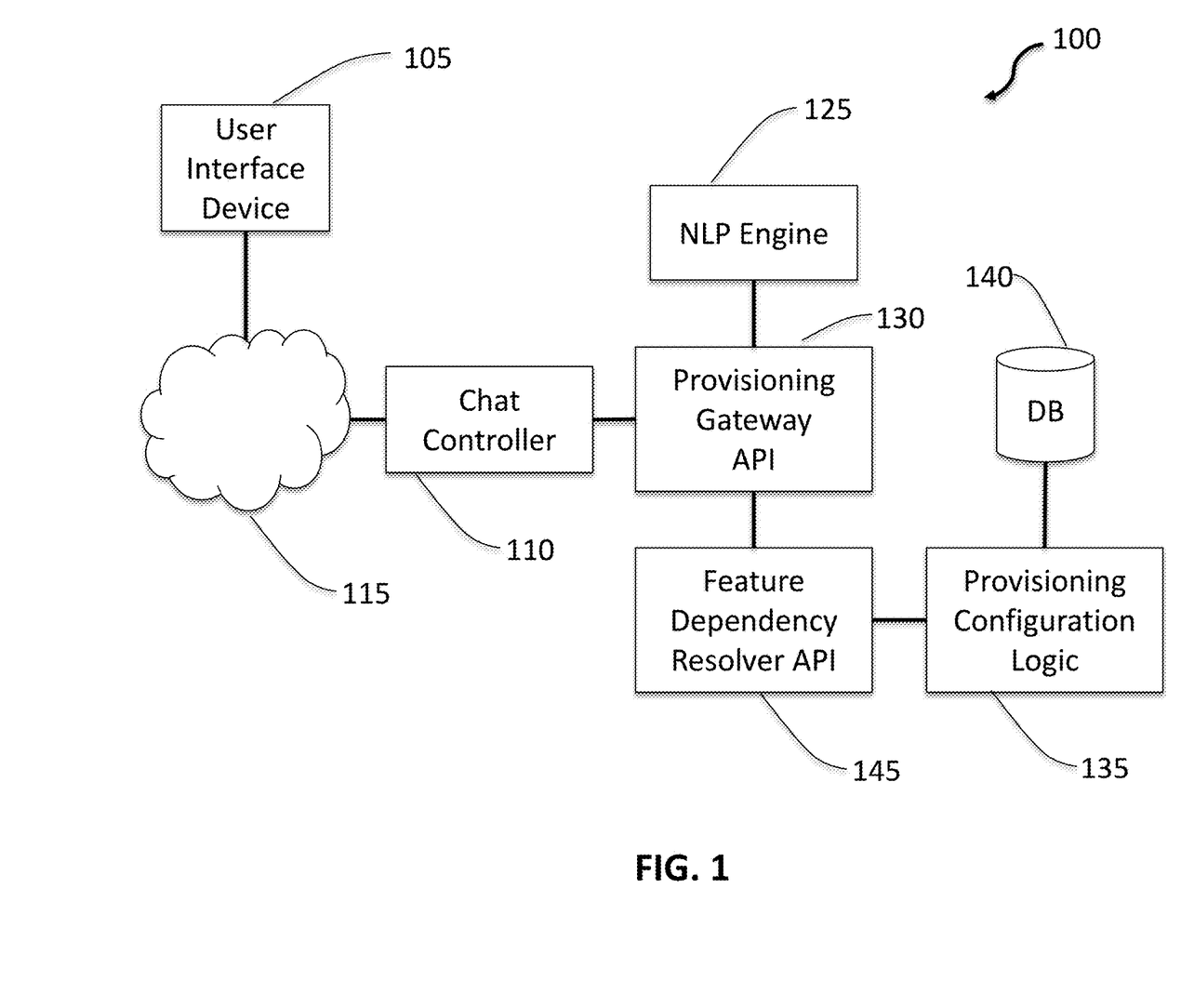
FIG. 1 is a block diagram of a software provisioning system with an interactive chat-based user interface.

FIG. 1 is a block diagram of a software provisioning system 100 with an interactive chat-based user interface. A user interface device 105, such as, for example, a mobile phone, tablet, or computer, is used to access a chatbot, i.e., a chat controller 110 via a network 115 (e.g., the Internet). The communication between the user interface device 105 and the chat controller 110 can be conducted using any of a number of conventional chat apps, such as Slack or Skype. The chat controller 110 receives chat messages from the user interface device 105 and sends appropriate responses based on algorithms (including, e.g., conversational scripts and templates) configured to interact with the user to effect software provisioning for a business/database software system, as discussed in further detail below.

The term "provisioning" refers to the selective enablement or disablement of particular features of a software system for a particular customer, e.g., a company or organization. The features may involve new capabilities of the software system, as well as changes to existing system functionality. For example, a user, e.g., a system administrator, may wish to provision the customer account they are handling for their company with an enhanced user interface which has been developed by the software vendor.

On the other hand, an administrator may decide not to provision, i.e., adopt, a new feature if it would result in incompatibilities or other problems in their system. For example, a new user interface may require scripting languages which may not be available without significant changes to the customer's system. As a further example, a particular feature may require substantial user training, and it may take a significant amount of time for a customer to provide such training to all of its users. In such a case, a customer may decide to delay provisioning of the feature. The software vendor may provide "provisioning switches" to allow customers to selectively enable new features at a time of their choosing. The provisioning switches may be implemented by storing a number of indicators for each customer in a provisioning database 140. Each indicator may relate to a specific feature and a specific customer and may, for example, have two settings: a first setting to indicate that the feature is enabled for the customer; and a second setting to indicate that the feature is not enabled for the customer.

If the user, e.g., the system administrator, for a particular customer account addresses a chat message to the provisioning system, e.g., via a provisioning channel or address, the chat controller 110 will pass the user's message to a Provisioning Gateway API 130 ("Provisioning API"), which controls the processing of the user input. The Provisioning Gateway API 130 may be accessed via, e.g., a representational state transfer (REST) API. The Provisioning API 130 sends the user's conversational chat inputs to a Natural Language Processing (NLP) Engine 125. The NLP Engine 125 receives the user input and interprets such inputs to determine the user's intent. The NLP engine 125 performs syntax analysis to identify parts of speech and create dependency parse trees to map the grammatical structure of a request. An entity analysis may also be performed to identify entities and label by types, such as person, organization, location, and software features. For example, a user input may be interpreted to mean that the user would like to have a particular feature provisioned to the user's system. Third-party NLP platforms, such as, for example, Microsoft's Language Understanding Intelligent Service (LUIS) Google's api.ai may be used to perform the user input interpretation.

The output of the NLP engine 125 to the Provisioning API 130 provides an interpreted version of the user's chat input which allows the Provisioning API 130 to implement an appropriate response to the user's chat input. For example, if a user input is interpreted to be a provisioning request, then the request is sent to a set of APIs, as discussed below. In such a case, the name of the feature being requested is received from the NLP engine 125, which may have a dictionary containing multiple variations of the feature names, e.g., aliases, to allow the correct feature to be resolved. If necessary, the Provisioning API 130, via the chat controller 110, can ask the user for clarification and/or confirmation of the name of the requested feature. If the user input is interpreted by the NLP engine 125 to be a question or other type of request, then an appropriate response is provided by the Provisioning API 130, via the chat controller 110. If the user's chat input cannot be handled by the provisioning system, or if the user requests to be connected to an operator or agent, the user may be connected to a human agent who can provide further information.

To execute a provisioning request, the Provisioning API 130 passes the feature name as a parameter to a Feature Dependency Resolver API 145 to determine whether there are any necessary prerequisites for the requested feature, i.e., dependent features, which must be enabled before the requested feature can be enabled and/or used. The Feature Dependency Resolver API 145 accesses the provisioning database 140, which stores the feature dependencies for each available feature, and returns feature IDs of the requested feature and any dependent features. In disclosed embodiments, the dependent feature information may be stored in a separate database or may be part of the provisioning database 140. In disclosed embodiments, the chat controller 110 may communicate with the user interface device 105 to obtain permission to proceed with the provisioning of the requested feature and any dependent features which have not already been enabled. The system may be configured so that at least some of the dependent features are automatically provisioned without further approval by the user. In disclosed embodiments, the provisioning configuration logic 135 may adapted to provision only those dependent features which have not already been enabled.

The feature IDs of the requested feature and any dependent features are sent as parameters to the Feature Dependency Resolver API 145, which accesses the provisioning configuration logic 135 to enable the requested feature and any dependent features. The provisioning logic 135 accesses a provisioning database 140 which stores a configuration state for each customer indicating the features which have been enabled for the customer. The provisioning database 140 may provide indications in the form of "provisioning switches," which are stored data elements having, e.g., two possible states. One state of each switch indicates a status of a particular feature for a particular customer as being enabled, while the other state of each switch indicates that the feature in question has not been enabled for the customer. As described above, the Feature Dependency Resolver API 145 may be called with a "status request" which passes a feature name as a parameter. The Feature Dependency Resolver API 145 returns a status for the feature, i.e., whether it is currently enabled for the customer, and a list of all dependent features and their respective statuses.

The provisioning switches stored in the provisioning database 140 may also be accessible through a separate provider interface (not shown) which is used by the software provider to provision software features to their customers. The provider interface may access the database 140 via the provisioning configuration logic 135. The provider interface may include a group of display pages which list the available features of the software system and provide an indicator, e.g., a check box, which indicates whether each feature is enabled for the customer. In conventional provisioning systems, a system administrator may have to communicate directly with a human agent of the software provider who, in turn, uses the provider interface to change the software features available to the customer account managed by the system administrator, i.e., to change the state of the provisioning "switches."

Figure 2:
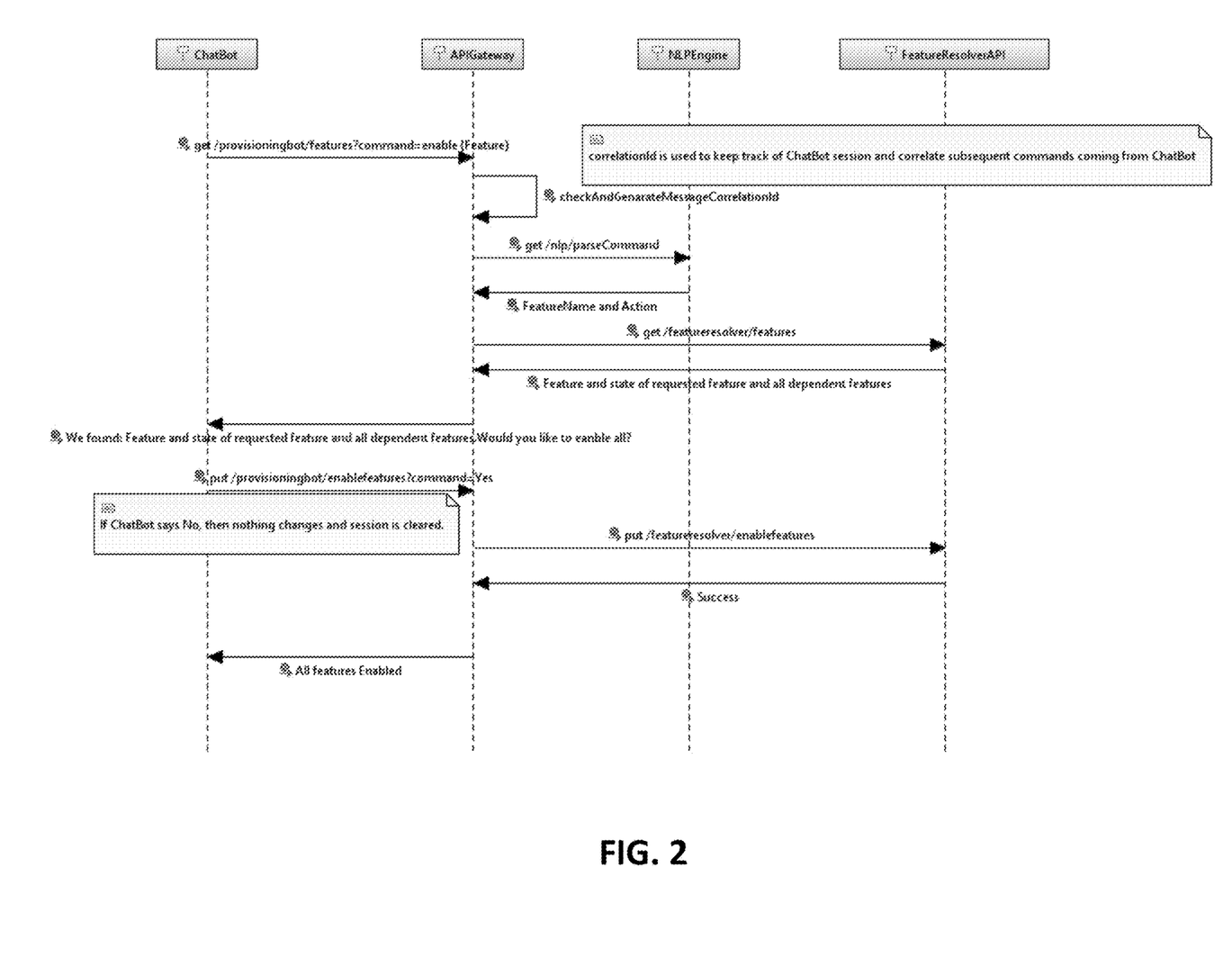
FIG. 2 is a data flow diagram for a chat-based interactive provisioning of software by the software provisioning system.

FIG. 2 is a data flow diagram for the chat-based interactive provisioning of software by the software provisioning system. The chat controller 110 ("ChatBot") is configured to make an API call ("get/provisioningbot/features") to the Provisioning API 130 ("APIGateway"). The API call includes a parameter which is the user input received via the chat controller 110, i.e., the user's request as entered into the user's chat client. The Provisioning API 130 generates an identifier ("correlationID") which is used to establish a session so that the subsequent communication can be identified as being to/from the same user. The Provisioning API 130 sends an API call ("get/nlp/parseCommand") to the NLP engine 125 ("NLPEngine") which includes the user input received via the chat controller 110 as a parameter so that the user input can be parsed by the NLP engine 125. The NLP engine 125 API returns data in a format having an optional "feature-name," which is a string containing the name of the feature to be acted upon, and an optional "action," which is a string specifying an action the user has requested, e.g., enable, disable, etc. The output may, for example, be in the form of a JSON string (where "aeiou" is a placeholder for the sake of simplicity):

```
{
    "feature_name" : "aeiou",
    "action" : "aeiou"
}
```

The Provisioning API 130 makes an API call ("get/featureresolver/features") to the Feature Dependency Resolver API 145 with the name of the requested feature as a parameter. The Feature Dependency Resolver API 145 returns data which identifies the requested feature and any necessary dependent features and the current state of such features, i.e., whether the features are enabled for the customer. The output data may include a feature ID, feature name, feature description, and status for the requested feature and any dependent features. The output may, for example, be in the form of a JSON string (where "aeiou" is a placeholder for the sake of simplicity):

```
[ {
    "feature_id" : "aeiou",
    "feature_name" : "aeiou",
    "feature_description" : "aeiou",
    "status" : true
} ]
```

The receipt by the Provisioning API 130 of the requested feature, dependent features, and the current state of such features from the Feature Dependency Resolver API 145 triggers a response by the Provisioning API 130 to the earlier API call ("get/provisioningbot/features") from the chat controller 110. The data returned to the chat controller 110 is the feature ID, feature name, feature description, and status for the requested feature and any dependent features, as described above. The chat controller 110 may use this data to send a chat message to the user interface device 105 informing the user of any dependent features which need to be enabled along with the requested feature. The chat controller 110 also requests that the user confirm the enabling of all of these dependent features. Alternatively, the chat message and confirmation request may be generated by the Provisioning API 130 and returned to the chat controller 110 as a text string.

If the user responds "yes" to the dependent feature confirmation message, the chat controller 110 makes an API call ("put/provisioningbot/enablefeatures") to the Provisioning API 130 to initiate the enabling of the requested features and any dependent features. The Provisioning API 130, in turn, makes an API call to the Feature Dependency Resolver API 145 ("put/featureresolver/enablefeatures"), sending as parameters the feature IDs of the requested feature and any dependent features to be enabled. The Feature Dependency Resolver API 145 returns a "success" message to the Provisioning API 130 if the enabling of the features is completed successfully. Similarly, the Provisioning API 130 returns a "success" message to the chat controller 110 as a response to the earlier API call ("get/provisioningbot/features") from the chat controller 110 to the Provisioning API 130. The chat controller 110 may then send a chat message to the user via the user interface device 105 to confirm that the features have been enabled. If the user responds "no" to the dependent feature confirmation message, the provisioning session is ended without changes being made to the user's feature configuration.

Figure 3:
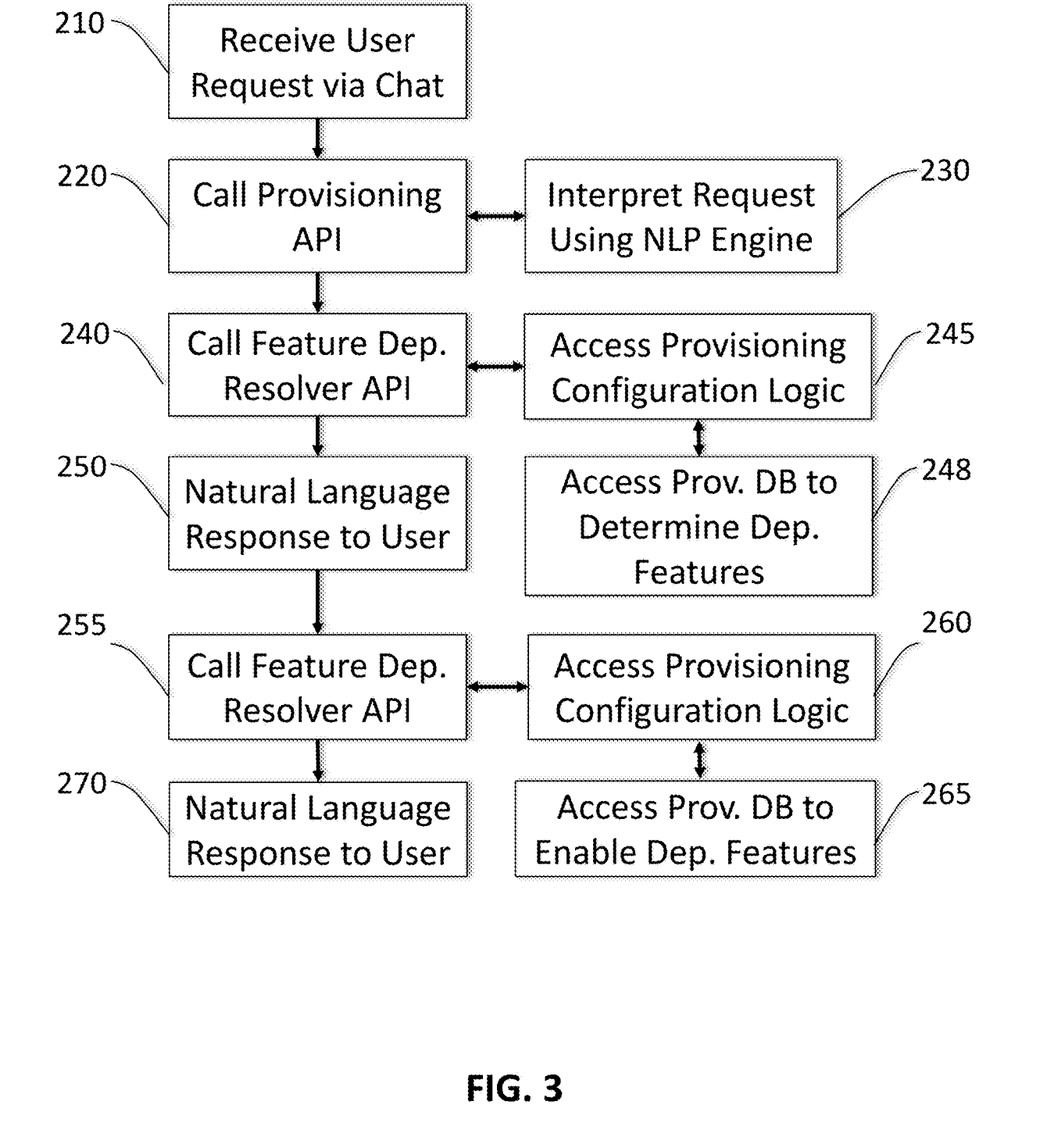
FIG. 3 is a flow diagram for a chat-based interactive provisioning of software by the software provisioning system.

FIG. 3 is a flow diagram for a chat-based interactive provisioning of software by the software provisioning system 100. The provisioning is initiated by the receipt of a request in the form of a chat message sent from the user via the user interface device 105 to the chat controller 110 (step 210). One or more chat usernames may be assigned by the software provider to one or more chat controllers 110 configured to receive such requests. The chat controller 110 calls the Provisioning API 130 to execute the user's provisioning request (step 220). The call made to the Provisioning API 130 includes the user input received via the chat controller 110

The user input parameter of the request received by the Provisioning API 130 is interpreted using the NLP engine 125, as discussed above, to determine the intent of the request (step 230), resulting in a feature name and an action, e.g., "enable." If the request is interpreted to be a provisioning request, then the feature name for the requested feature is passed as a parameter to the Feature Dependency Resolver API 145 (step 240). The Feature Dependency Resolver API 145 is configured to access the provisioning configuration logic (Step 245) and, in turn, the provisioning database 140 for determining the dependent features of the requested feature and their status, e.g., "not enabled." (step 248). The Provisioning API 130 receives, from the Feature Dependency Resolver API 145, feature names and IDs of the dependent features and their status. A natural language response may be provided via the chat controller 110 to the user interface device 105 based on the dependent feature information (step 250). For example, the user may be asked to confirm that the dependent features are to be enabled along with the requested feature.

After receiving confirmation from the user (if confirmation is requested), the Provisioning API 130 passes the feature IDs of the requested feature and any dependent features to the Feature Dependency Resolver API 145 (Step 255). The Feature Dependency Resolver API 145 is configured to access the provisioning configuration logic 135 (Step 260) to effect changes to the provisioning switches stored in the provisioning database 140 corresponding to the features being provisioned to the customer account of the user (step 265). A natural language response may be provided to the user interface device 105 to indicate that the provisioning is complete (step 270). The response may include the names of the features which have been provisioned as a result of the request. The response may also indicate if any of the dependent features were already enabled prior to the provisioning of the requested feature.

In disclosed embodiments, the software provisioning system 100 may be configured to control processes for the installation, copy, and transformation of software systems. For example, the software provisioning system 100 may access a software provisioning manager (not shown), which is an installation tool for controlling provisioning across a broad range of platforms and products of the software provider. Using the software provisioning system 100, in conjunction with the software provisioning manager, the provisioning procedures can be made to work in a similar manner on multiple platforms, with minor differences in the parameter input phase. This combination of tools allows a user to perform various provisioning tasks, such as, for example, dual-stack split, system copy and migration, system installation, and system rename. In disclosed embodiments, the user can interact with the chat controller 110 to control the software provisioning procedures of a remote host from a local host.

Figure 4:
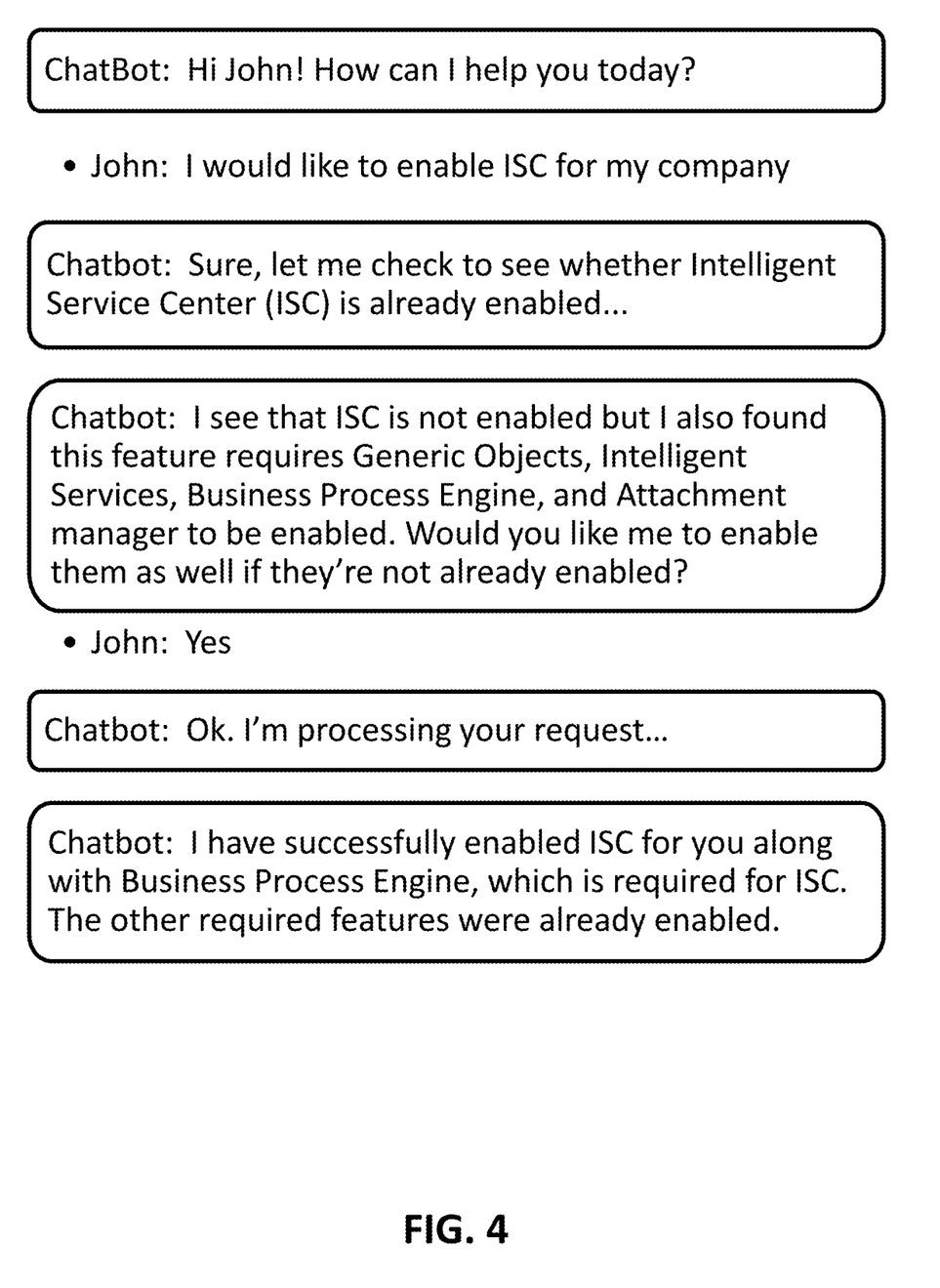
FIG. 4 depicts a chat session between a user and a provisioning chat controller.

FIG. 4 depicts a chat session between a user and a provisioning chat controller. In the example depicted, the user is requesting the provisioning of a feature called Intelligent Service Center (ISC). The chat controller, in some instances, may present a greeting to the user. The user then submits a request in natural language form. The chat controller may then determine whether the feature is already provisioned to the user. If the user inputs an acronym (as in this example) or an ambiguous name, to describe the feature being requested, the chat controller may respond with the feature name spelled out to help the user confirm that the correct feature is being provisioned. If it is not possible to resolve the feature name without ambiguity, then the chat controller may ask the user for clarification. In the example depicted, the chat controller has responded with a statement indicating that the requested feature is not currently enabled. The chat controller informs the user of the dependent features required for the requested feature, and asks the user to confirm enablement of the dependent features (if they are not already enabled). If the user responds affirmatively to the question of enabling the dependent features, then the provisioning of the requested feature will be performed by the chat controller. Upon completion of a successful provisioning, the chat controller informs the user that the requested feature has been enabled, as well as any dependent features which have been enabled. The chat controller may also indicate to the user that the one or more of the dependent features were already enabled.

Figure 5:
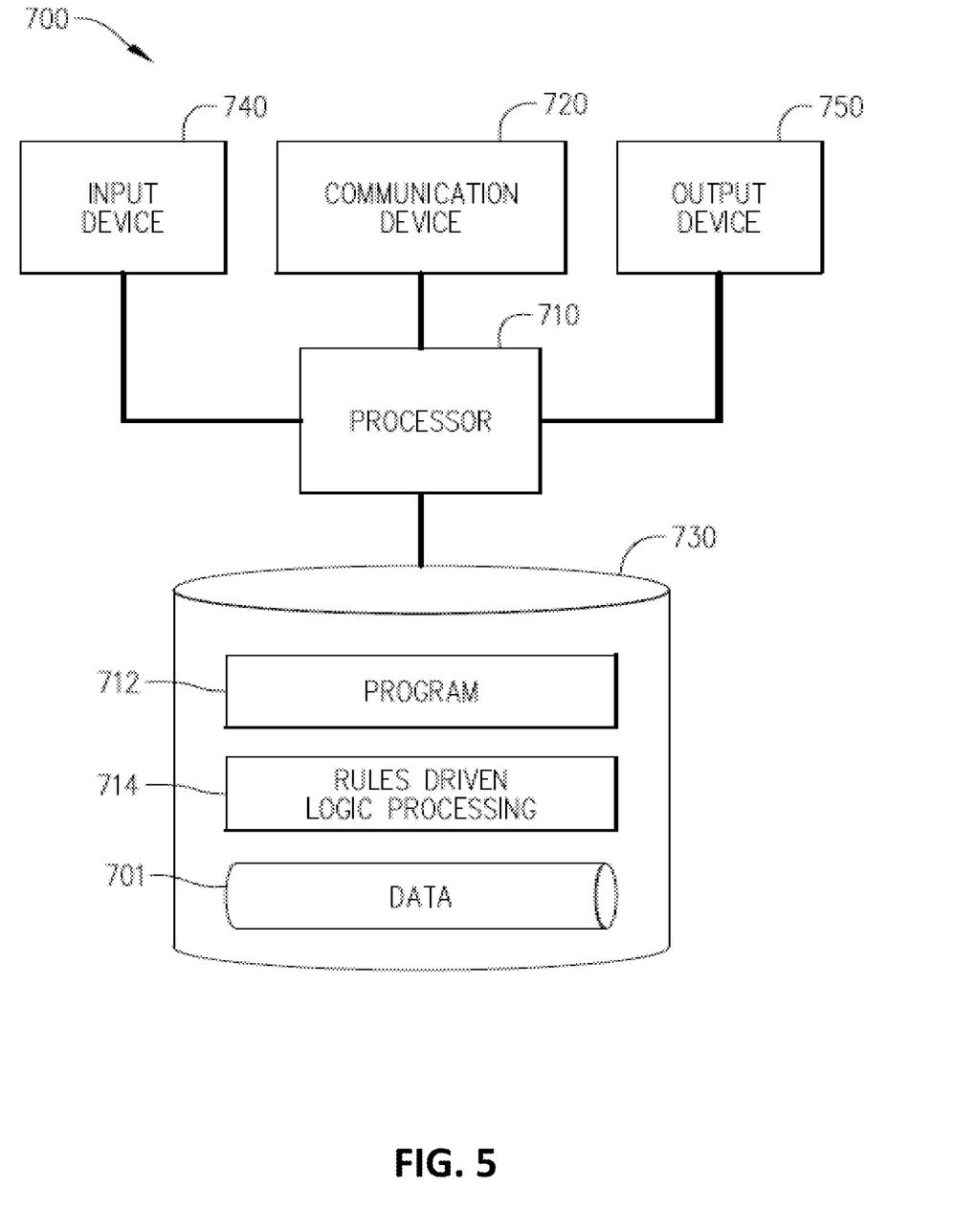
FIG. 5 is a block diagram of a system according to some embodiments.

FIG. 5 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 100. Apparatus 700 may include other unshown elements according to some embodiments.

Apparatus 700 includes PIH processor 710 operatively coupled to communication device 720, data storage device/memory 730, one or more input devices 740, and one or more output devices 750. Communication device 720 may facilitate communication with external devices, such as application server 130. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc.

The storage device 730 stores a program 712 and/or PIH platform logic 714 for controlling the processor 710. The processor 710 performs instructions of the programs 712, 714, and thereby operates in accordance with any of the embodiments described herein, including but not limited to process 300. The storage device 730 stores data 701.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method of performing software provisioning using an interactive chat-based user interface, the method comprising:

receiving a chat input from a user, at a server having a processor, memory, and a network interface, the user input being received via the network interface by a chat controller running on the processor of the server;

interpreting the user input using natural language processing to determine a requested feature to be provisioned to a customer account of the user, wherein the requested feature is a capability of a software application;

determining, by accessing a provisioning database, an identifier of the requested feature and identifiers of dependent features which are to be provisioned with the requested feature, wherein the dependent features are pre-requisite features enabled before the requested feature can be used, and wherein the provisioning database includes provisioning switch indicators, each of the provisioning switch indicators relating to the corresponding customer account and a requested corresponding feature, each of the switch indicators having a first setting indicating that the requested corresponding feature is enabled for the corresponding customer account and a second setting indicating that the requested corresponding feature is not enabled for the corresponding customer account;

determining the provisioning switch indicator related to the requested corresponding feature is in the second setting;

performing, by the chat controller, the provisioning of the requested feature and the determined dependent features for the requested feature based on the received chat input at the network interface and determination of the provisioning switch indicator being in the second setting;

and enabling the requested feature and the determined dependent features for the requested feature and the determined dependent features having the provisioning switch indicator in the second setting, wherein the requested feature and the determined dependent features for the requested feature are not already enabled, by accessing the provisioning database based on at least one parameter, the at least one parameter comprising an identifier of the requested feature and the identifiers of the determined dependent features obtained in the determining step.

2. The method of claim 1, further comprising sending a natural language response to the user via the network using the chat controller, the response identifying the requested feature and the determined dependent features and requesting confirmation from the user to perform the provisioning.

3. The method of claim 1, further comprising sending a natural language response to the user via the network using the chat controller, the response identifying the requested feature and the determined dependent features which have been enabled.

4. The method of claim 1, wherein the determining of the identifier of the requested feature comprises accessing the provisioning database to retrieve the identifier of the requested feature based on a name of the requested feature obtained from the user input.

5. The method of claim 4, further comprising retrieving aliases of the name of the requested feature.

6. The method of claim 1, further comprising sending a natural language response to the user via the network using the chat controller, the response requesting confirmation or clarification of a name of the requested feature.

7. The method of claim 1, wherein the determining step comprises calling a feature dependency API to determine the identifiers of the dependent features and provisioning indicators indicating whether the requested feature and the determined dependent features are enabled for the customer account of the user.

8. The method of claim 7, wherein the enabling step comprises calling the feature dependency API, which changes a setting of at least one provisioning indicator, in the provisioning database, corresponding to the requested feature and the determined dependent features.

9. A system for performing software provisioning using an interactive chat-based user interface, the system comprising:

at least one server having a processor, memory, and a network interface, said at least one server being configured to perform:

receiving a chat input from a user, at said at least one server, the user input being received via the network interface by a chat controller running on the processor of said at least one server;

interpreting the user input using natural language processing to determine a requested feature to be provisioned to a customer account of the user, wherein the requested feature is a capability of a software application;

determining, by accessing a provisioning database, an identifier of the requested feature and identifiers of dependent features which are to be provisioned with the requested feature, wherein the dependent features are enabled before the requested feature can be used;

providing, via the provisioning database, provisioning switch indicators, each of the provisioning switch indicators relating to the corresponding customer account and a requested corresponding feature, each of the switch indicators having a first setting indicating that the requested corresponding feature is enabled for the corresponding customer account and a second setting indicating that the requested corresponding feature is not enabled for the corresponding customer account;

determining the provisioning switch indicator related to the requested corresponding feature is in the second setting;

performing, via the chat controller, the provisioning of the requested feature and the determined dependent features for the requested feature based on the received chat input at the network interface and determination of the provisioning switch indicator being in the second setting;

and enabling the requested feature and the determined dependent features for the requested features and the determined dependent features having the provisioning switch indicator in the second setting, wherein the requested feature and the determined dependent features for the requested features are not already enabled, by accessing the provisioning database based on at least one parameter, the at least one parameter comprising an identifier of the requested feature and the identifiers of the determined dependent features obtained in the determining step.

10. The system of claim 9, wherein said at least one server is further configured to perform sending a natural language response to the user via the network using the chat controller, the response identifying the requested feature and the determined dependent features and requesting confirmation from the user to perform the provisioning.

11. The system of claim 9, wherein said at least one server is further configured to perform sending a natural language response to the user via the network using the chat controller, the response identifying the requested feature and the determined dependent features which have been enabled.

12. The system of claim 9, wherein the determining, performed by said at least one server, of the identifier of the requested feature comprises accessing the provisioning database to retrieve the identifier of the requested feature based on a name of the requested feature obtained from the user input.

13. The system of claim 12, wherein said at least one server is further configured to perform retrieving aliases of the name of the requested feature.

14. The system of claim 9, wherein said at least one server is further configured to perform sending a natural language response to the user via the network using the chat controller, the response requesting confirmation or clarification of a name of the requested feature.

15. The system of claim 9, wherein the determining step, performed by said at least one server, comprises calling a feature dependency API to determine the identifiers of the dependent features and provisioning indicators indicating whether the requested feature and the determined dependent features are enabled for the customer account of the user.

16. The system of claim 15, wherein the enabling step comprises calling the feature dependency API, which changes a setting of at least one provisioning indicator, in the provisioning database, corresponding to the requested feature and the determined dependent features.

17. A non-transitory computer-readable medium storing program instructions executed by a processor of a computer system having memory, the medium comprising instructions for causing the processor to perform:
  receiving a chat input from a user, at a server having a processor, memory, and a network interface, the user input being received via the network interface by a chat controller running on the processor of the server;
  interpreting the user input using natural language processing to determine a requested feature to be provisioned to a customer account of the user, wherein the requested feature is a capability of a software application;
  determining, by accessing a provisioning database, an identifier of the requested feature and identifiers of dependent features which are to be provisioned with the requested feature, wherein the dependent features are enabled before the requested feature can be used;
  providing, via the provisioning database, provisioning switch indicators, each of the provisioning switch indicators relating to the corresponding customer account and a requested corresponding feature, each of the switch indicators having a first setting indicating that the requested corresponding feature is enabled for the corresponding customer account and a second setting indicating that the requested corresponding feature is not enabled for the corresponding customer account;
  determining the provisioning switch indicator related to the requested corresponding feature is in the second setting;
  performing, via the chat controller, the provisioning of the requested feature and the determined dependent features for the requested feature based on the received chat input at the network interface and determination of the provisioning switch indicator being in the second setting;
  and
  enabling the requested feature and the determined dependent features for the requested features and the determined dependent features having the provisioning switch indicator in the second setting, wherein the requested feature and the determined dependent features for the requested feature are not already enabled, by accessing the provisioning database based on at least one parameter, the at least one parameter comprising an identifier of the requested feature and the identifiers of the determined dependent features obtained in the determining step.

18. The non-transitory computer-readable medium of claim 17, wherein:
  the determining step comprises calling a feature dependency API to determine the identifiers of the dependent features and provisioning indicators indicating whether the requested feature and the determined dependent features are enabled for the customer account of the user, and
  the enabling step comprises calling the feature dependency API, which changes a setting of at least one provisioning indicator, in the provisioning database, corresponding to the requested feature and the determined dependent features.

* * * * *